United States Patent [19]

Yoshimura et al.

[11] Patent Number: 5,362,930
[45] Date of Patent: Nov. 8, 1994

[54] COORDINATE INPUT APPARATUS

[75] Inventors: Yuichiro Yoshimura, Kamakura; Atsushi Tanaka, Kawasaki; Kiyoshi Kaneko, Yokohama; Katsuyuki Kobayashi, Yokohama; Masaki Tokioka, Yokohama, all of Japan

[73] Assignee: Canon Kabushiki Kaisha, Tokyo, Japan

[21] Appl. No.: 905,523

[22] Filed: Jun. 29, 1992

[30] Foreign Application Priority Data

Jul. 16, 1991 [JP] Japan .................. 3-175008

[51] Int. Cl.$^5$ ............................. G08C 21/00
[52] U.S. Cl. ............................. 178/18; 178/19
[58] Field of Search ............... 178/18, 19, 20; 367/907, 118, 129; 340/706

[56] References Cited

U.S. PATENT DOCUMENTS 4,859,814  8/1989  Sciacero et al. ............ 178/19
4,980,518  12/1990  Kobayashi ................... 178/18

*Primary Examiner*—Stephen Chin
*Assistant Examiner*—Kevin Kim
*Attorney, Agent, or Firm*—Fitzpatrick, Cella, Harper & Scinto

[57] ABSTRACT

A coordinate input apparatus according to the present invention eliminates distortion caused by interference of a asymmetrical plate wave with an asymmetrical plate wave from the vibrations which are detected after they have been propagated in a vibration transmitting member and performs a highly accurate position coordinate detection. The vibrations of a pen which is brought into contact with the vibration transmitting member are detected by sensors provided on both the front and rear surfaces of the vibration transmitting member to determine a coordinate of a position where the vibrating pen has been brought into contact. At that time, the vibration sensors mounted on the front and rear of the vibration transmitting member in an opposed relation detect vibrations on the two surfaces of the transmitting member. The signals which are detected by each pair of front and rear sensors represent vibrations in which the asymmetrical plate waves having the same phase and the 180° out-of-phase asymmetrical plate waves are superimposed on top of one another. The signals of the two sensors are input to a differential circuit. A resultant differential signal is input to a signal waveform detecting circuit. Since the differential signal is a signal in which the asymmetrical waves are cancelled with each other and in which the asymmetrical waves are amplified by twice, reduction in the vibration detection accuracy which is caused by distortion of waveforms can be prevented.

26 Claims, 9 Drawing Sheets

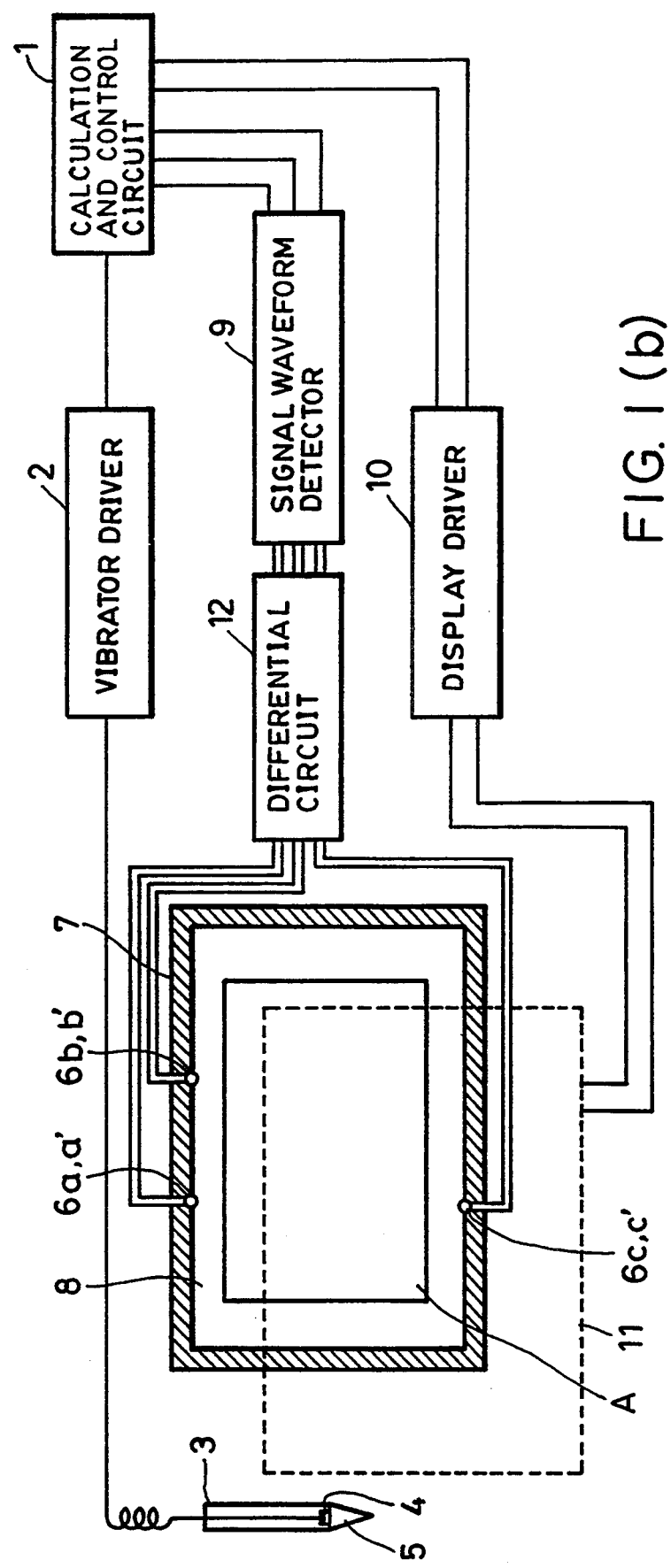
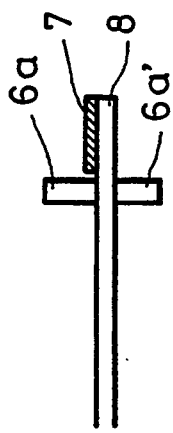
FIG. 1(a)
FIG. 1(b)

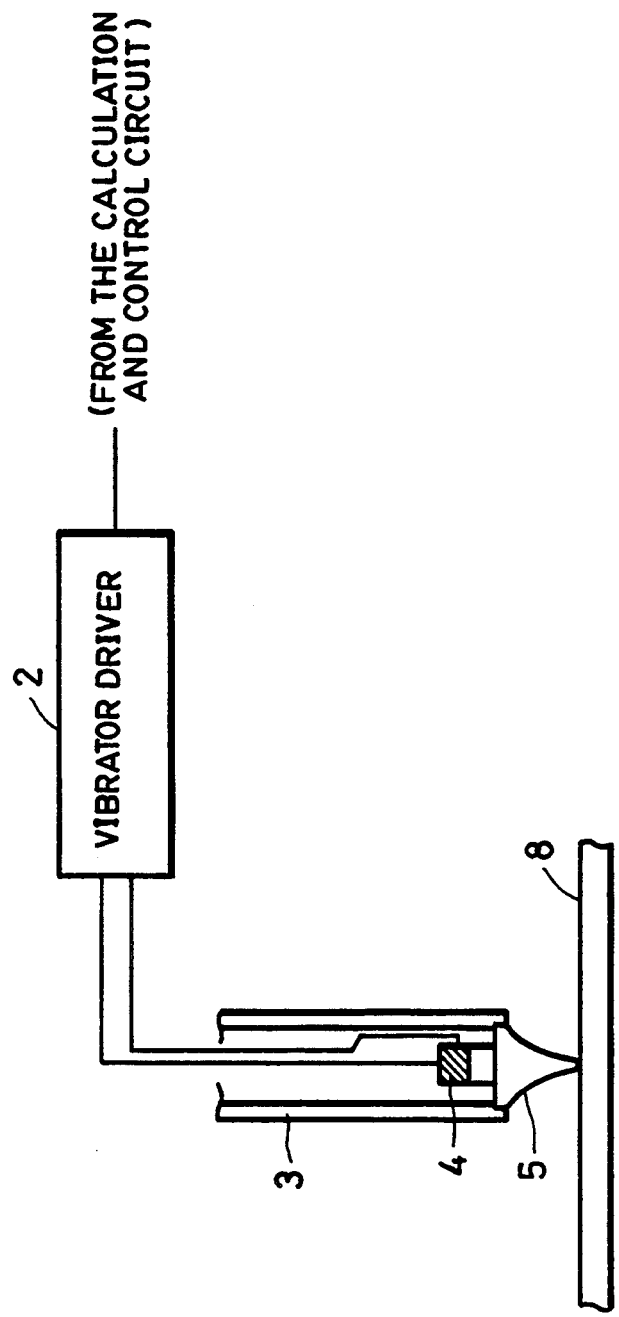

COORDINATE INPUT APPARATUS

BACKGROUND OF THE INVENTION

1. Field of the Invention

The present invention relates to a coordinate input apparatus for detecting a coordinate of a designated point by sensing vibrations and determining a vibration transmitting time across a vibration transmitting plate.

2. Description of the Related Art

Conventionally, coordinate input apparatus require an operator to input vibrations to a vibration transmitting plate by using a vibrating pen having a piezoelectric element incorporated thereinto. The coordinate of an input point is detected by plurality of sensors provided on the vibration transmitting plate.

In such a coordinate input apparatus, a sensor 6 comprising a piezoelectric element is mounted vertically on the surface of a vibration transmitting plate at the peripheral portion thereof to detect vibrations, as shown in FIG. 11.

However, the waveform detected by the aforementioned conventional sensor structure is a distorted waveform since two modes are superimposed on top of one another causing a deterioration in the detection accuracy for the following reasons.

Vibrations which transmit in a plate-like vibrating member are vibrations, called plate waves, whose transmission speed is determined by the frequency and by the thickness of the vibrating plate. In the plate wave, there are two modes: a symmetrical plate wave (which is mainly composed of a longitudinal wave, shown in FIG. 12(a)) and an asymmetrical plate wave (which is mainly composed of a lateral wave, shown in FIG. 12(b)). In the conventional sensor structure shown in FIG. 11, when the diameter of a piezoelectric element having a vibration mode which is perpendicular to the surface of a vibration transmitting plate 8 (that is, which detects the asymmetrical plate wave mainly composed of a lateral wave) is large as compared with the waveform to such an extent that it cannot be ignored (generally, 1/10th of the waveform or above), the piezoelectric element detects both the asymmetrical wave and the vibrations whose vibration mode is parallel to the surface of the vibration transmitting plate (that is, the symmetrical plate wave mainly composed of a longitudinal wave). Thus, the detection signal from the sensor 6 comprising a piezoelectric element has a distorted waveform in which the two modes are superimposed on top of one another.

SUMMARY OF THE INVENTION

In view of the aforementioned problem, it is an object of the present invention to provide a coordinate input apparatus which is capable of decreasing the adverse effects due to an interference of vibrations having two modes on a detection signal and to provide a coordinate input apparatus which is capable of highly accurate coordinate detection.

It is another object of the present invention to provide a coordinate input apparatus which is capable of preventing distortion caused by a superimposition of signal waveforms having different vibration modes by outputting a signal which is obtained by cancelling signal components having the same phase as the signals detected by vibration sensors and also by intensifying the components having the opposite phase.

According to one aspect of the present invention, a coordinate input apparatus determines a coordinate of a vibration input position by measuring a vibration transmitting time. The input apparatus includes a vibration transmitting member for transmitting vibrations, vibration detection means disposed on the vibration transmitting member, and separation means for separating a signal of a single vibration mode from a signal detected by the vibration detection means.

According to another aspect of the present invention, a coordinate input apparatus comprises vibration input means for inputting vibrations, a vibration transmitting member for transmitting vibrations which are input from a vibration input means, a plurality of first vibration detection means disposed on a surface of the vibration transmitting member, a plurality of second vibration detection means disposed on a surface of the vibration transmitting member opposing and corresponding to the plurality of first vibration detection means, differential means for outputting a differential signal of both a signal detected by the first vibration detection means and a signal detected by the second vibration detection means, and position producing means for producing a coordinate of the contact position of the vibration input means on the basis of the differential signal which has been output from the differential means.

According to another aspect of the present invention, a coordinate input apparatus determines a coordinate of a vibration input position by measuring a vibration transmitting time. The coordinate input apparatus includes a vibration transmitting member for transmitting input vibrations, vibration detection means disposed on the vibration transmitting member, and output means for cancelling signal components having the same phase in signals detected by the vibration detection means and for intensifying opposite phase components of the signals.

According to another aspect of the invention, a coordinate input apparatus includes a vibrating pen for generating vibrations, a plate-like vibration transmitting member for transmitting the vibrations generated by the vibrating pen, a plurality of first vibration sensors disposed on a front surface of the vibration transmitting member, a plurality of second vibration sensors disposed on a rear surface of the vibration transmitting member in such a manner that they oppose the corresponding plurality of first vibration sensors, a differential circuit for outputting a differential signal between a signal detected by the first vibration sensor and a signal detected by the second vibration sensor, and a producing circuit for producing a positional coordinate where the vibrating pen is brought into contact on the basis of the differential signal which has been output from the differential circuit.

Objectives and advantages in addition to those discussed above shall be apparent to those skilled in the art from the description of the preferred embodiment of the invention which follows. In the description, reference is made to the accompanying drawings, which form a part thereof, and which illustrate an example of the invention. Such example, however, is not exhaustive of the various embodiments of the invention, and therefore reference is made to the appended claims for determining the scope of the invention.

BRIEF DESCRIPTION OF THE DRAWINGS

FIGS. 1(a)–1(b) is a block diagram of a coordinate input apparatus according to the present invention;

FIG. 2 illustrates a structure of a vibrating pen of the coordinate input apparatus according to the present invention;

DETAILED DESCRIPTION OF THE PREFERRED EMBODIMENTS

Figure 3:
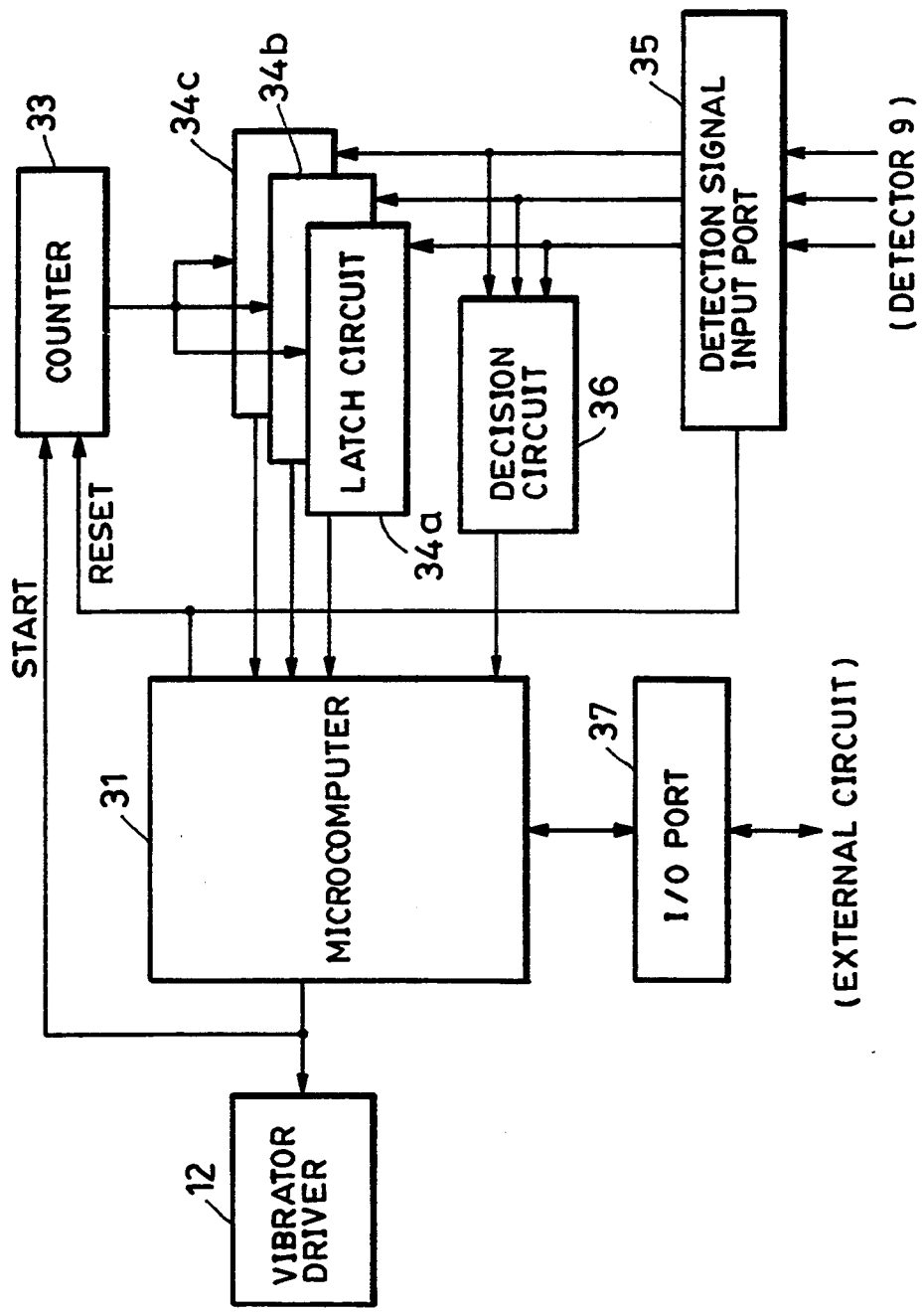
FIG. 3 illustrates an internal structure of a calculating and control circuit of the coordinate input apparatus according to the present invention.

An embodiment of the present invention will be described below in detail with reference to the accompanying drawings.

FIG. 1 illustrates a schematic view of a first embodiment of a coordinate input apparatus according to the present invention.

In FIG. 1, a calculation and control circuit 1 controls the entire apparatus and calculates a coordinate position. A vibrator driver 2 drives a nib 5 of a vibrating pen 3. A vibration transmitting plate 8 is made of a transparent material, such as an acrylic or glass plate. Coordinate input is performed when the operator touches the surface of the vibration transmitting plate 8 with the vibrating pen 3. In practical operation, the operator designates with the vibrating pen 3 an area of the vibration transmitting plate 8 which is enclosed by a solid line and indicated by a symbol A (hereinafter referred to as an effective area). A vibration-proof member 7 is provided on the outer periphery of the vibration transmitting plate 8 to prevent (lessen) reflected vibrations returning toward the central portion of the plate. Vibration sensors 6a through 6c such as piezoelectric elements for converting mechanical vibrations into an electric signal are fixed on an interface separating the vibration-proof member 7 and the vibration transmitting plate 8 at positions shown in FIG. 1. FIG. 1(b) is a cross-sectional view of a sensor mounting portion for the sensors 6a and 6a' (the sensor mounting portions for the sensors 6b, 6b' and 6c, 6c' are the same). As shown in FIG. 1(b), the sensors 6a and 6a' are mounted at the same position on the front and rear surfaces of the vibration transmitting plate 8 (the sensors 6b and 6b' as well as 6c and 6c' are mounted in the same manner). Electric signals from the sensors 6a and 6a' are sent to a differential circuit 12 to obtain a difference between them. The obtained differential signal is sent to a signal waveform detector 9 which produces a signal indicating that the sensors 6a, 6a' through 6c, 6c' detect vibrations. The detection signal is sent to the calculation and control circuit 1. A display 11, such as a CRT (or a liquid crystal display), located behind the vibration transmitting plate 8 is capable of displaying dots. The drive of a display driver 10 allows a dot to be displayed at a position where the operator has touched with the vibrating pen 3. The displayed dot can be seen through the vibration transmitting plate 8 (because it is made of a transparent material). That is, a dot display is performed on the display 11 at the position corresponding to the detected coordinate of the vibrating pen 3, and as the operator moves the vibrating pen 3, an image consisting of elements input from the vibrating pen 3, such as the points or lines, appears on the display as if it is drawn on a sheet of paper.

In the above structure, selection of an item from a menu displayed on the display 11 by the vibrating pen 3 or an input method in which the operator touches a predetermined position of a prompt displayed with the vibrating pen 3 can also be made possible.

FIG. 2 illustrates (a cross-sectional view) of the vibrating pen 3 employed in the first embodiment.

A vibrator 4 incorporated in the vibrating pen 3 is driven by the vibrator driver 2. A drive signal for the vibrator 4 is supplied from the calculation and control circuit 1 in the form of a low level pulse signal. The supplied pulse signal is amplified by the vibrator driver 2 which is capable of driving at a low impedance and at a predetermined gain, and is then applied to the vibrator 4.

The vibrator 4 converts the electric drive signal into a mechanical ultrasonic vibrations. The converted vibrations are transmitted to the vibration transmitting plate 8 through a horn portion (a nib) 5.

The vibration frequency for the vibrator 4 is set to a value which enables a plate wave to be generated in the vibration transmitting plate 8 which is made of an acrylic or glass plate. Also, a vibration mode which enables the vibrator 4 to vibrate mainly in the vertical direction shown in FIG. 2 with respect to the vibration transmitting plate 8 is selected when the vibrator is driven. If the vibration frequency for the vibrator 4 is the resonant frequency of the vibrator 4, efficient vibration conversion is possible.

The elastic wave transmitted to the vibration transmitting plate 8 in the manner described above is a plate wave which is less affected by damages or obstacles on the surface of the vibration transmitting plate as compared with a surface wave.

The principle of the coordinate input apparatus, including the dimensions of the vibration transmitting plate 8, the mounting position of the reflection preventing member 7, and the positions of the vibration sensors 6a, 6a' through 6c, 6c', will be described later in detail.

The calculation and control circuit 1 outputs, to the vibrator driver 2, a signal for driving the vibrator 4 in the vibrating pen 2 at predetermined time intervals (for example, every 5 ms). Also, the calculation and control circuit 1 starts a counter incorporated therein for time counting. The vibrations generated by the vibrating pen 3 arrive at the vibration sensors 6aa' through 6cc' (the pair made up of 6a and 6a' is represented by 6aa') after a period of time corresponding to the distance from the vibrating pen 3 to each pair of the vibration sensors 6aa' through 6cc' has elapsed. The signal waveform detector 9 detects the signals from each pair of the vibration sensors 6aa' through 6cc', and performs a waveform detection process on the detected signals, which will be described later, to produce a signal which represents the vibration arrival time at which vibrations arrive at each pair of the vibration sensors. The calculation and control circuit 1 receives the signal generated for each pair of sensors, detects the vibration transmission time to each pair of the vibration sensors 6aa' through 6cc', and calculates the coordinate position of the vibrating pen.

The calculation and control circuit 1 controls a display on the display 11 on the basis of the calculated coordinate position data on the vibrating pen 3.

The individual components of the calculation and control circuit 1 and the operation thereof will be explained below with reference to FIG. 3 which illustrates the internal structure of the calculation and control circuit 1.

In FIG. 3, a microcomputer 31 for controlling the calculation and control circuit 1 and the entire coordinate input apparatus incorporates an internal counter, a ROM in which the operation procedures are stored, a RAM used as a work area and so on. A counter 33 counts by utilizing a reference clock (not shown). The counter 33 starts counting time when the start signal is output to the vibrator driver 12 to start drive of the vibrator 4 in the vibrating pen 3, by which time counting and vibration generation are synchronized to each other.

The other components will be described later one by one.

The vibration arrival time signals for the vibration sensors 6aa' through 6cc', which are obtained through the differential circuit 12 and the signal waveform detector 9, are input to latch circuits 34a through 34c from a detection signal input port 35. The latch circuits 34a through 34c correspond to the vibration sensors 6aa' through 6cc', respectively. When the latch circuits 34a through 34c have received the timing signals of the corresponding vibration sensor pair, they latch the times set in the counter 33 at those times. When a decision circuit 36 determines that all the detection signals have been received, it outputs a signal to the microcomputer 31. Upon receipt of this signal from the decision circuit 36, the microcomputer 31 reads, from the latch circuits, 34a through 34c, the vibration transmission time to each pair of the vibration sensors and performs predetermined calculations on the times to obtain the coordinate position of the vibration pen 3 on the vibration transmitting plate 8. The microcomputer 31 outputs the calculated coordinate position data to the display driver 10 from an I/O port 37 to display, for example, a dot at a corresponding position on the display.

The principle of measuring the vibration transmission time to the vibration sensor will be explained below.

FIGS. 4 through 7 show the detection waveforms input to the signal waveform detector 9, and illustrate the measuring process of the vibration transmission time which is based on the detection waveforms. Hereinafter, the measuring process for the vibration sensors 6aa' will be described, because it is the same as the measuring process for the vibration sensors 6bb' and 6cc'.

Measurement of the vibration transmitting time to the vibration sensors 6a and 6a' begins when the start signal is output to the vibrator driver 2, as mentioned above.

At that time, a signal 41 is applied to the vibrator 4 from the vibrator driver 2.

The ultrasonic vibrations transmitted from the vibrating pen 3 to the vibration transmitting plate 8 by the signal 41 are propagated in the vibration transmitting plate 8 over a time tg corresponding to the distance from the vibrating pen 3 to the vibration sensors 6aa', and are then detected by the vibration sensors 6aa'.

Figure 5:
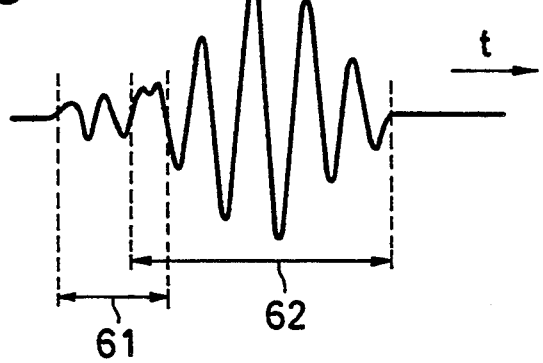
FIG. 5 shows a waveform of a detection signal of the vibration sensor.
Figure 6:
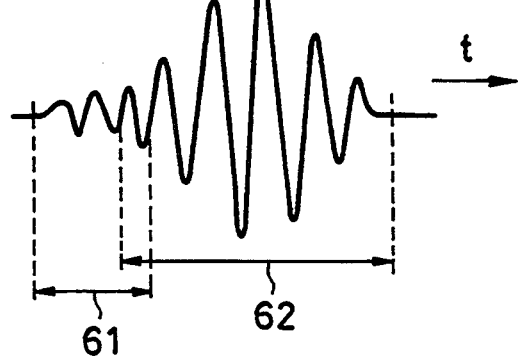
FIG. 6 shows a waveform of a detection signal of the vibration sensor.
Figure 7:
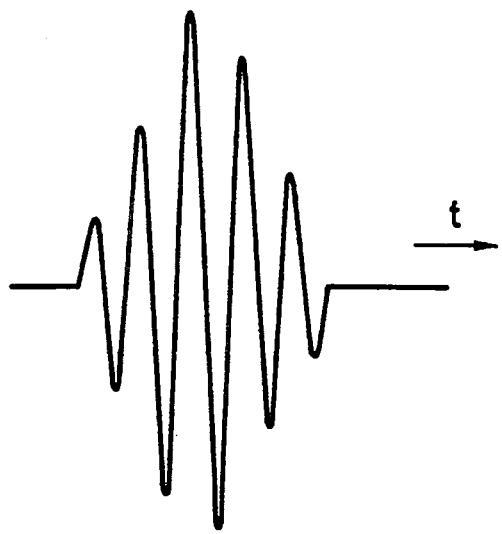
FIG. 7 shows a waveform of an output signal of a differential circuit.

FIG. 5 shows the signal waveform detected by the sensor 6a mounted on the front surface of the vibration transmitting plate 8. FIG. 6 shows the signal waveform detected by the sensor 6a' mounted on the rear surface. As mentioned above, when the diameter of a piezoelectric element (which detects asymmetrical plate waves which are mainly composed of lateral waves) whose vibration mode is perpendicular to the surface of the vibration transmitting plate is large as compared with the wavelength to an extent that it cannot be ignored, that piezoelectric element detects, together with the asymmetrical plate waves, vibrations whose vibrations whose mode is parallel to the surface of the vibration transmitting plate (which are symmetrical plate waves which are mainly composed of longitudinal waves). Therefore, the signal waveforms detected by the sensors 6a and 6a' are distorted ones shown in FIGS. 5 and 6 in which two modes are superimposed on top of one another (since the symmetrical waves 62 propagate faster than the asymmetrical waves 61, they are detected in advance of the asymmetrical waves on a time axis t, as shown in FIGS. 5 and 6). In the first embodiment, since the sensors 6a and 6a' are mounted on the opposing surfaces of the vibration transmitting plate, respectively, the symmetrical wave in the signal waveform (FIG. 5) detected by the sensor 6a is in phase with the symmetrical wave in the signal waveform (FIG. 6) detected by the sensor 6b, while the asymmetrical wave detected by the sensor 6a is 180° out of phase with the asymmetrical wave detected by the sensor 6a'. Both the symmetrical and asymmetrical waves in the signal waveforms detected by the sensors 6a and 6b have the same amplitude.

Figure 8:
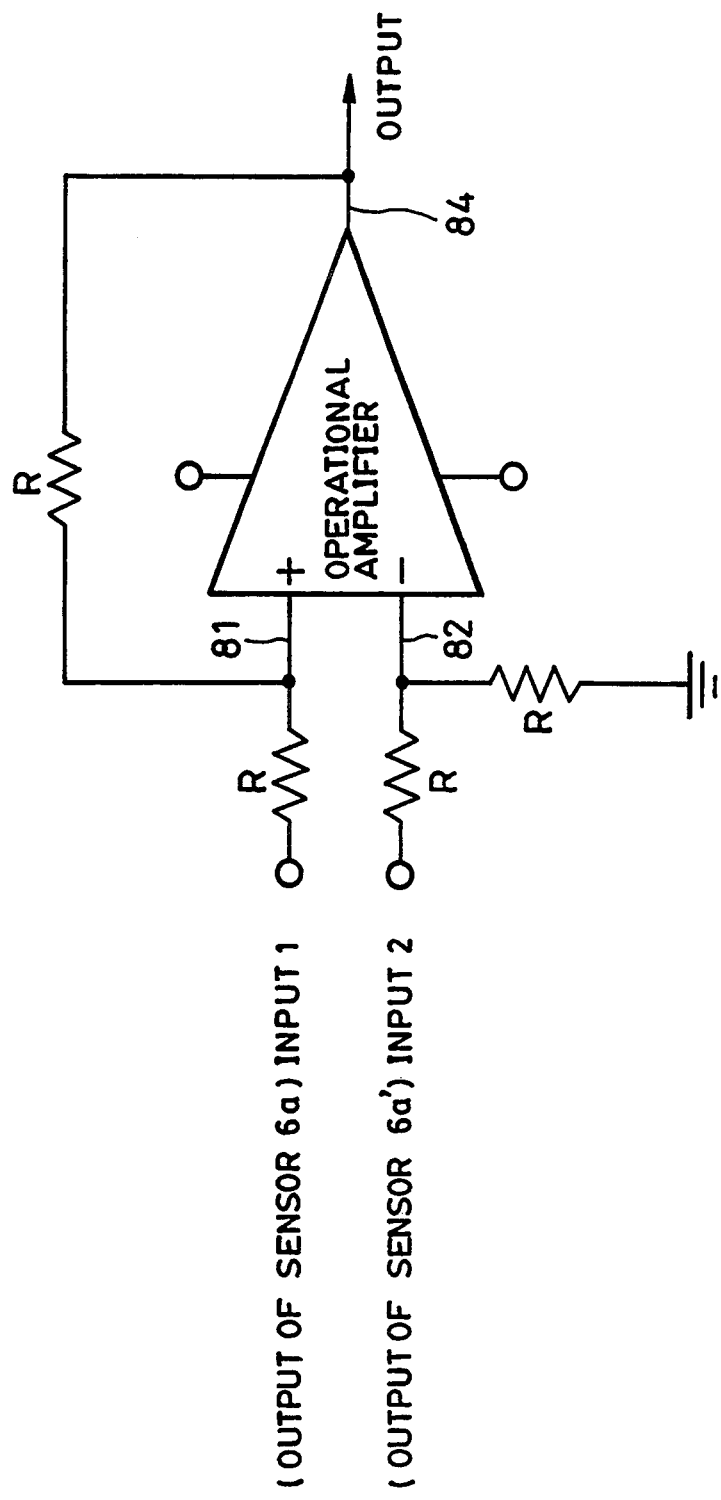
FIG. 8 shows the structure of the differential circuit.

The signal waveform of the sensor 6a (FIG. 5) and the signal waveform of the sensor 6a' (FIG. 6) are sent to the differential circuit 12 (which may be a differential amplifier shown in FIG. 8) to obtain a difference between the two signal waveforms. The circuit shown in FIG. 8 receives the outputs of the sensors 6a and 6a' and outputs a difference between the inputs from the sensors 6a and 6a' from an output terminal 84. Thus, the output signal of the circuit shown in FIG. 8 is one in which the symmetrical wave components having the same phase are cancelled with each other and in which the asymmetrical wave components having an opposite phase, which are to be detected, are amplified by a factor of two. That is, the differential circuit 12 produces an undistorted signal waveform resulting from the superimposition of the two modes, and thus allows for highly accurate distance/coordinate detection in the circuits which will be described later.

Figure 4:
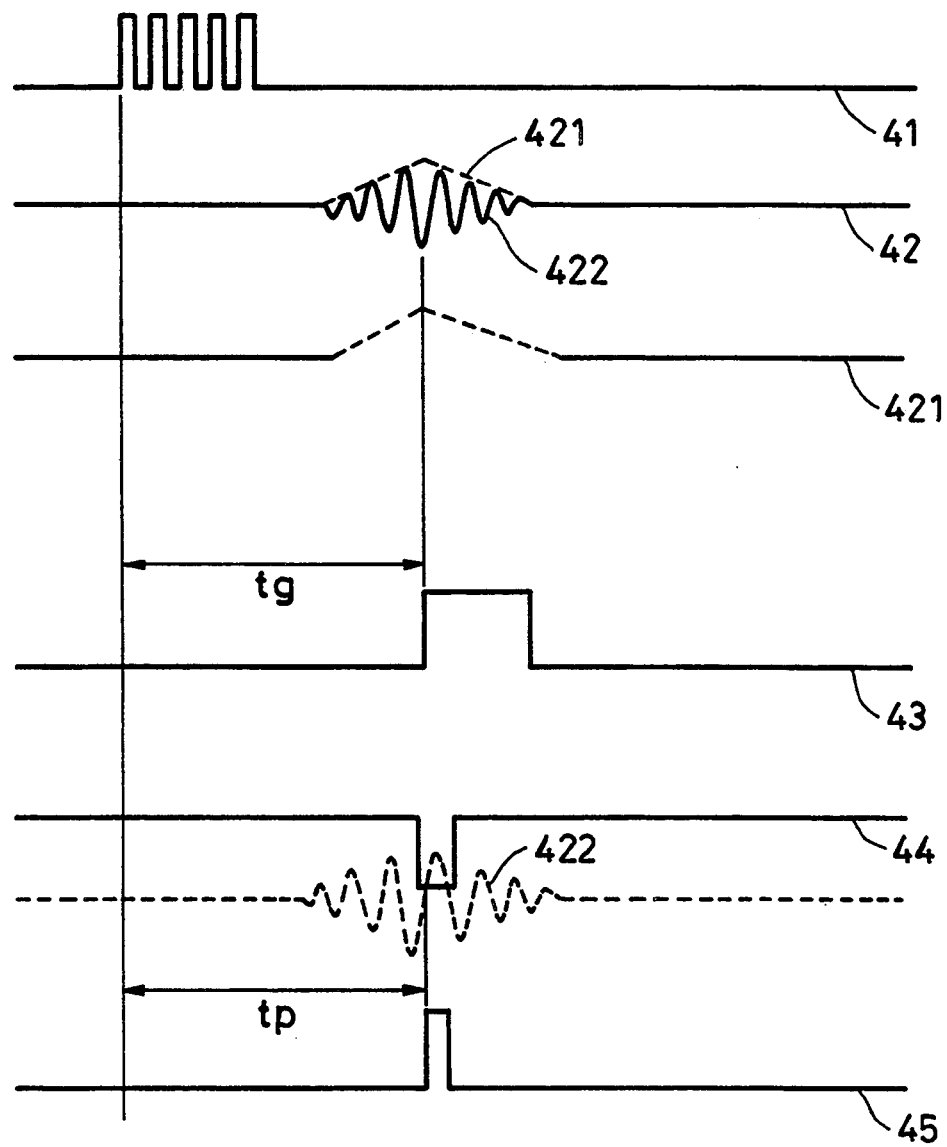
FIG. 4 illustrates measurement of a distance between the vibrating pen and a vibration sensor.

The output waveform of the differential circuit shown in FIG. 8 is also indicated by 42 in FIG. 4.

Since the vibrations employed in this embodiment are plate waves, the relation between an envelope 421 and a phase 422 of the detected waveform changes according the transmission distance in the vibration transmitting plate 8 during vibration transmission.

Where Vg is the group velocity at which the envelope 421 propagates and Vp is the phase velocity of the phase 422, the distance between the vibrating pen 3 and the vibration sensor 6a can be detected from the difference between the group velocity Vg and the phase velocity Vp.

First, consideration is given to the envelope 421 having the velocity Vg alone. Assuming that a certain point on the waveform, for example, the peak of the envelope 421, is detected as a signal indicated by 43 in FIG. 4, a distance d between the vibrating pen 3 and the vibration sensors 6aa' is calculated using a vibration transmitting time tg of the envelope 421 as follows:

$$d = Vg \cdot tg \qquad (1)$$

The above equation is associated with the vibration sensors 6aa'. The distance between the other two vibration sensors 6bb' and 6cc' and the vibrating pen 3 is expressed similarly.

To obtain a more accurate coordinate value, the process based on the detected phase signal is performed.

When the time related to a special detection point on the phase waveform signal 422, e.g., the time from the application of vibrations to a zero-cross point immediately after the peak is tp (which is obtained by generating a window signal 44 having a predetermined width from the signal 43 and by comparing the window signal 44 with the phase signal 422), the distance between the vibration sensor and the vibrating pen is calculated by:

$$d = n \cdot \lambda p + Vp + \cdot tp \qquad (2)$$

where λp is a wavelength of an elastic wave, and n is an integer.

From equations (1) and (2), we have $$n = [(Vg \cdot tg - Vp \cdot tp)/\lambda p + 1/N] \qquad (3)$$

N is any real number other than 0. If N=2 and within ±½ waveform, n can be determined. The distance between the vibrating pen 3 and the vibration sensors 6aa', between the vibrating pen 3 and the vibration sensors 6bb', or between the vibrating pen 3 and the vibration sensors 6cc' can be accurately measured by substituting n in equation (2).

Figure 9:
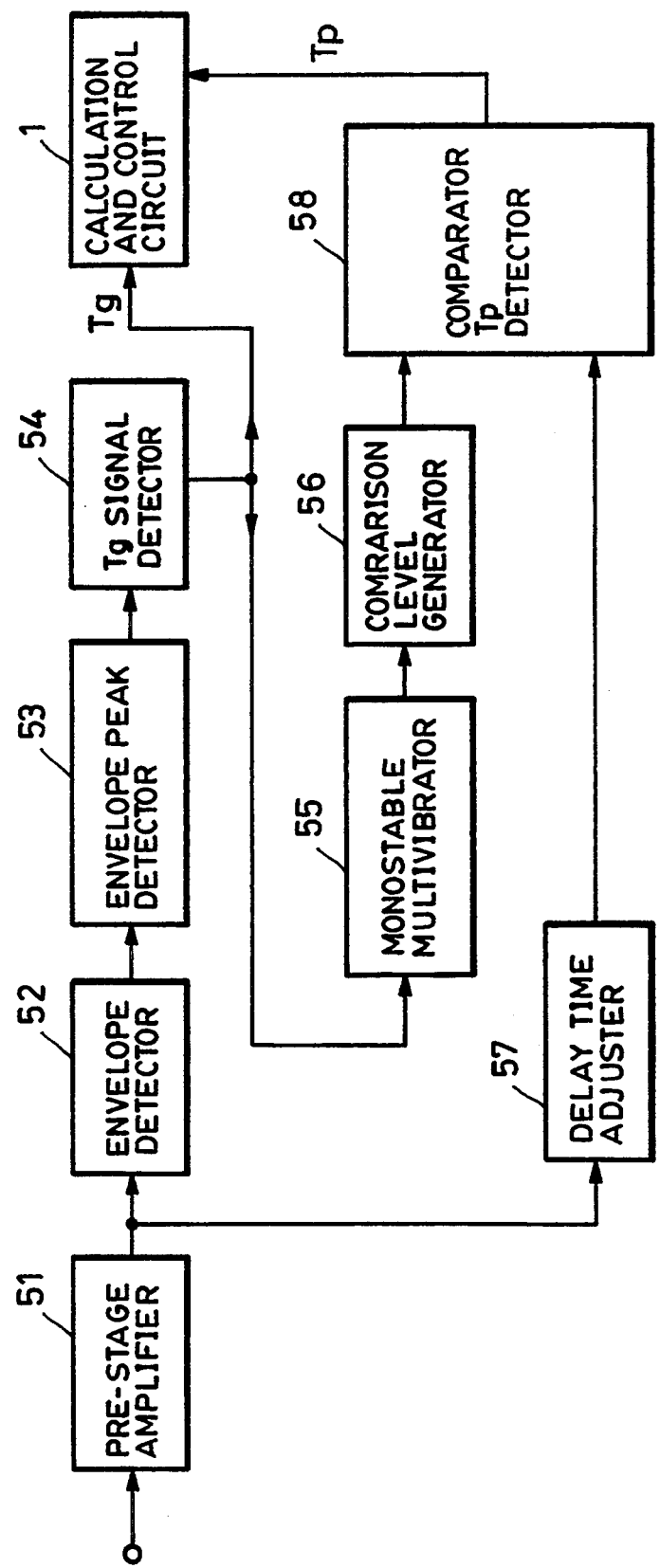
FIG. 9 shows the structure of a signal waveform detector of the coordinate input apparatus according to the present invention.
Figure 10:
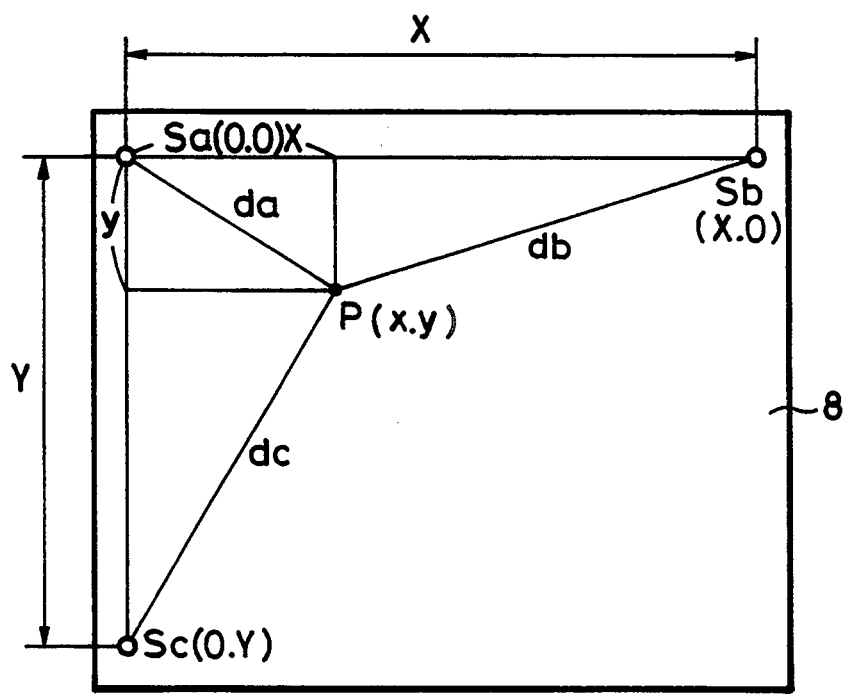
FIG. 10 illustrates the principle of the coordinate position calculation of the present invention.
Figure 11:
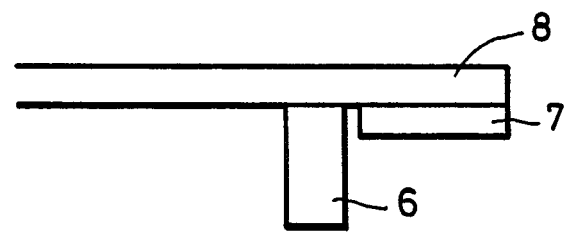
FIG. 11 shows the structure of a conventional coordinate input apparatus.
Figure 12A:
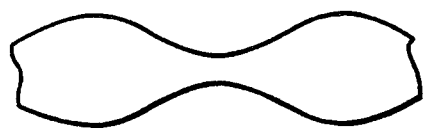
FIGS. 12(a)–12(b) is a schematic view illustrating a plate wave.
Figure 12B:

The signal waveform detector 9 which generates the signals 43 and 45 to measure the two vibration transmitting times tg and tp have the structure shown in FIG. 9.

In FIG. 9, the output signal of the differential circuit 12 which represents a difference between the sensors 6a and 6a' is amplified to a predetermined level by a pre-state amplifier 51. The amplified signal is input to an envelope detector 52 which extracts only the envelope of the detection signal. An envelope peak detector 53 detects a peak of the extracted envelope. A Tg signal detector 54 comprising a monostable multivibrator forms a signal Tg (signal 43) which is an envelope delay time detection signal having a predetermined waveform, and inputs the signal Tg to the calculation and control circuit 1.

Also, the signal Tg passes through a monostable multivibrator 55 (which generates the signal 44) to a comparison level generator 56 and finally supplied to a comparator Tp detector 58 which compares the resulting signal with an original signal which has been delayed by a delay time adjuster 57. The phase delay time signal Tp from the comparator Tp detector 58 is supplied to the calculation and control circuit 1.

The above-described circuit is for the vibration sensors 6aa'. The same type of circuit is provided for each of the sensor pairs 6bb' and 6cc'.

If the number of sensors is h, there are h detection signals, consisting of envelope delay times Tg1 through Tgh and the phase delay times Tp1 through Tph, are input to the calculation and control circuit 1.

The calculation and control circuit 1 inputs the signals Tg1 through Tgh and Tp1 through Tph from the input port 35, and takes in the counted values of the counter 33 into the latch circuits 34a through 34c using the individual signals as triggers. Since the counter 33 has been started synchronously with the drive of the vibrating pen 3, the data in the latch circuits 34a through 34c are those representing the delay times for both the envelope and the phase of each of the individual differential signals of each pair of the vibration sensors 6aa' through 6cc'.

The principle of the detection method of the coordinate position of the vibrating pen 3 on the vibration transmitting plate 8 will be explained below.

It is assumed that the coordinate of the vibration sensors 6aa' on the vibrating transmitting plate 8 is Sa (0, 0), that is, an origin, that the coordinate positions of the vibration sensors 6bb' and 6cc' are Sb (X, 0) and Sc (0, Y), respectively, and that the coordinate of the vibration pen is P (x, y).

When distances between the vibrating pen 3 and the individual vibrating sensors 6aa' through 6cc' are da through dc on the basis of the aforementioned principle, P(x, y) can be obtained using Pythagorean theorem as follows:

$$x = X/2 + \{(da + db) \cdot (da - db)\}/2X$$

$$y = Y/2 + \{(da + dc) \cdot (da - dc)\}/2X$$

where X and Y are the lateral and longitudinal distances from the vibrating sensors 6aa' to the vibration sensors 6bb, and 6cc', respectively.

It is thus possible to detect the position coordinate of the vibrating pen 3 on a real-time basis.

Although the above-described embodiment employs the differential circuit, any means capable of cancelling the symmetrical wave components having the same phase and of intensifying the asymmetrical wave components having the opposite phase by a factor of two can be used. It may be means in which the electrodes of the two sensors mounted on the front and rear of the vibrating transmitting plate have opposite polarities and in which the output signals from these sensors are connected to an adding circuit.

In the above embodiment, the differential circuit is provided in advance of the pre-amplifier 51. However, it may be provided behind the pre-amplifier 51 so that the aforementioned process can be performed on the signal which has been amplified to a predetermined level by the pre-amplifier 51.

Thus, in the aforementioned apparatuses, influence of interference of vibrations in two modes can be lessened, and highly accurate positional coordinate detection is possible.

Furthermore, in the above apparatuses, since the waveform interference of the two modes which occurs in the negative direction (in an advanced direction) of the time axis can be lessened, the detection points of Tg and Tp can be provided in the negative direction (in an advanced direction) of the time axis, and a highly accurate positional coordinate can thus be detected without influence of a reflected wave in the positive direction (in a subsequent direction).

As will be understood from the foregoing description, it is possible according to the present invention to lessen the influence of the interference of vibrations having two modes on the detection signals and to detect a highly accurate positional coordinate.

What is claimed is:

1. A coordinate input apparatus for determining a coordinate of a vibration input position by measuring a vibration transmitting time, said apparatus comprising;
   a vibration transmitting member for transmitting vibrations;
   a first vibration detection means disposed on a first surface of said vibration transmitting member for detecting vibration signals;
   a second vibration detection means disposed on a second surface of said vibration transmitting member, said second vibration detection means being located so as to directly oppose said first vibration transmitting detection means for detecting vibration signals; and
   separation means for separating a signal of a single vibration mode on the basis of both a signal detected by said first vibration detection means and a signal detected by the second vibration detection means.

2. The coordinate input apparatus according to claim 1, wherein said separation means comprises a differential circuit.

3. The coordinate input apparatus according to claim 1, wherein said vibration transmitting member comprises a transparent plate-shaped member with a display device disposed below said vibration transmitting member.

4. The coordinate input apparatus according to claim 1, wherein said vibration detection means comprises a piezoelectric element.

5. The coordinate input apparatus according to claim 1, further comprising coordinate position producing means for determining the coordinate of the vibration input position in accordance with the signal which has been separated by said separation means in the single vibration mode.

6. The coordinate input apparatus according to claim 5, wherein said vibration detection means detects a signal of a plate wave transmitting through said vibration transmitting member, and wherein said coordinate position producing means obtains a phase delay time signal and a group delay time signal in accordance with the signal in an asymmetrical plate wave mode separated by said separation means to determine the coordinate position of the vibration input position.

7. A coordinate input apparatus comprising:
   vibration input means for inputting vibrations;
   a vibration transmitting member for transmitting vibrations input from said vibration input means;
   a plurality of first vibration detection means disposed on a first surface of said vibration transmitting member for detecting vibration signals;
   a plurality of second vibration detection means which directly opposes said plurality of first vibration detection means disposed on a second surface of said vibration transmitting member in such a manner that said plurality of second vibration detection means directly opposes the corresponding plurality of first vibration detection means on the first surface for detecting vibration signals;
   differential means for outputting a differential signal of a signal detected by said first vibration detection means and a signal detected by said second vibration detection means; and
   position producing means for producing a coordinate of the contact position of said vibration input means on the basis of the differential signal which has been output from said differential means.

8. The coordinate input apparatus according to claim 7, wherein said differential means comprises a differential amplifier.

9. The coordinate input apparatus according to claim 7, wherein said vibration transmitting member comprises a transparent plate-like member with a display device disposed below said vibration transmitting member.

10. The coordinate input apparatus according to claim 7, wherein said vibration detection means comprises a piezoelectric element.

11. The coordinate input apparatus according to claim 7, wherein said vibration detection means detects a signal of a plate wave transmitting through said vibration transmitting member, and wherein said position producing means obtains a phase delay time signal and a group delay time signal in accordance with the the signal of an asymmetrical plate wave output from said differential means to produce the coordinate position at a point of contact with said vibration input means.

12. The coordinate input apparatus according to claim 7, wherein said vibration input means has a structure of a pen having a piezoelectric element for generating vibrations incorporated therein.

13. A coordinate input apparatus for determining a coordinate of a vibration input position by measuring a vibration transmitting time, said apparatus comprising:
   a vibration transmitting member for transmitting input vibrations;
   a first vibration detection means disposed on a surface of said vibration transmitting member for detecting vibration signals;
   a second vibration detection means disposed on the other surface of said vibration transmitting member, which directly opposes said first vibration detection means for detecting vibration signals; and
   output means for outputting a signal obtained by cancelling components having the same phase in both a signal detected by said first vibration detection means and a signal detected by said second vibration detection means and by intensifying signal components having the opposite phase of the signals.

14. The coordinate input apparatus according to claim 13, wherein said vibration transmitting member comprises a transparent plate-like member with a display device disposed below said vibration transmitting member.

15. The coordinate input apparatus according to claim 13, wherein said vibration detection means comprises a piezoelectric element.

16. The coordinate input apparatus according to claim 13, further comprising coordinate position producing means for determining the coordinate of the vibration input position in accordance with the output signal from said output means.

17. The coordinate input apparatus according to claim 14, wherein said vibration detection means detects a signal of a plate wave transmitting through said vibration transmitting member, and wherein said coordinate position producing means obtains a phase delay time signal and a group delay time signal in accordance with the output signal from said output means to produce the coordinate of the vibration input position.

18. A coordinate input apparatus comprising:
   a vibrating pen for generating vibrations;

a plate-like vibration transmitting member for transmitting the vibrations generated by said vibrating pen;

a plurality of first vibration sensors disposed on a front surface of said vibration transmitting member;

a plurality of second vibration sensors disposed on a rear surface of said vibration transmitting member in such a manner that the plurality of second vibration sensors oppose the corresponding plurality of first vibration sensors;

a differential circuit for outputting a differential signal between a signal detected by said first vibration sensor and a signal detected by said second vibration sensor; and a producing circuit for producing a positional coordinate on the basis of the differential signal, representing a contact point with the vibrating pen, output from said differential circuit.

19. The coordinate input apparatus according to claim 18, wherein said producing circuit includes an envelope detector for detecting an envelope signal of the differential signal, a peak detector for detecting an peak of the envelope signal, a detector for detecting a group delay time signal from the peak, a detector for detecting a phase delay time signal from both a comparison level signal produced on the basis of the group delay time signal and the differential signal, and a calculating circuit for calculating a position coordinate on the basis of the group delay time signal and the phase delay time signal.

20. The coordinate input apparatus according to claim 18, wherein each of said first and second vibration sensors comprises a piezoelectric element.

21. The coordinate input apparatus according to claim 18, wherein said vibration transmitting member comprises a transparent glass plate with a display device disposed below said vibration transmitting member.

22. The coordinate input apparatus according to claim 6, wherein said coordinate position producing means receives an input from said separation means which is a signal in which an asymmetrical plate wave is amplified by a factor of two.

23. The coordinate input apparatus according to claim 11, wherein the output from said differential means is a signal in which said asymmetrical plate wave is amplified by a factor of two.

24. The coordinate input apparatus according to claim 13, wherein signal components having the opposite phase of the signals are intensified by a factor of two.

25. The coordinate input apparatus according to claim 26, wherein the signal input to said differential circuit is amplified by a factor of two.

26. A coordinate input apparatus comprising:

a vibration transmitting member for transmitting vibrations;

indicating means for indicating the coordinate of a vibration input position, located under said vibration transmitting member;

a first vibration detecting means located on a first surface of said vibration transmitting member;

a second vibration detecting means located on a second surface of said vibration transmitting member, said second vibration detecting means directly opposes said first detection means on the first surface; and separation means for separating a signal of a single vibration mode on the basis of both a signal detected by said first vibration detection means and a signal detected by the second vibration detection means.

* * * * *

UNITED STATES PATENT AND TRADEMARK OFFICE
CERTIFICATE OF CORRECTION

PATENT NO. : 5,362,930
DATED : November 8, 1994
INVENTOR(S) : Yuichiro Yoshimura, et al.

It is certified that error appears in the above-identified patent and that said Letters Patent is hereby corrected as shown below:

COLUMN 3

Line 56, "6c." should read --6c,--.

COLUMN 12

Line 17, "claim 26" should read --claim 18--.

Signed and Sealed this

Eleventh Day of April, 1995

Attest:

BRUCE LEHMAN

Attesting Officer      Commissioner of Patents and Trademarks